United States Patent [19]

Yamasaki et al.

[11] Patent Number: 4,593,867

[45] Date of Patent: Jun. 10, 1986

[54] FILM STORAGE DEVICE IN CAMERA PROCESSOR

[75] Inventors: Teiichi Yamasaki; Yutaka Takahashi, both of Kanagawa, Japan

[73] Assignee: Fuji Photo Film Co., Ltd., Kanagawa, Japan

[21] Appl. No.: 450,176

[22] Filed: Dec. 16, 1982

[30] Foreign Application Priority Data

Dec. 22, 1981 [JP] Japan ............................ 56-206090

[51] Int. Cl.[4] ............................................ G03B 1/00

[52] U.S. Cl. .................................. 242/181; 242/56 R

[58] Field of Search ..................... 242/56 R, 55, 54 R, 242/58.6, 64, 71.1, 71.2, 79, 80, 56 A, 181

[56] References Cited

U.S. PATENT DOCUMENTS

| | | | |
|---|---|---|---|
| 1,202,346 | 10/1916 | Wooden | 242/71.2 |
| 1,984,744 | 12/1934 | Hood | 242/79 |
| 2,254,348 | 9/1941 | Bennewitz | 242/79 |
| 3,127,122 | 3/1964 | Roshkind | 242/56 A |
| 3,441,234 | 4/1969 | Barten | 242/80 |
| 3,690,751 | 9/1972 | von Fischern | 242/181 X |
| 3,870,244 | 3/1975 | Sarkisov et al. | 242/80 |

*Primary Examiner*—Donald Watkins

*Attorney, Agent, or Firm*—Sughrue, Mion, Zinn, Macpeak, and Seas

[57] ABSTRACT

A film storage device for a camera processor which contains a photographing track and a developing track includes two film storage tracks which each have a reel and a pair of rollers. The two film storage tracks are connected by a rotary shaft, and a supporting member is arranged perpendicular to said rotary shaft. The supporting member is capable of being rotated through 180° so that the rollers of each storage track alternatively correspond with the photographing track and the developing track of the camera processor.

2 Claims, 3 Drawing Figures

FILM STORAGE DEVICE IN CAMERA PROCESSOR

BACKGROUND OF THE INVENTION

1. Field of the Invention

The present invention relates to a camera processor which successively carries out image exposing, developing, fixing, washing and drying, and, more particularly, to a film storage device in a camera processor in which a long film is successively subject to an exposure and development operation.

2. Description of the Prior Art

A variety of systems have been proposed and implemented in which a photo-sensitive material, such as microfilm, is successively subjected to photographing and developing. In these systems, a photographing section and a developing section are provided adjacent to each other so that photographing, developing, fixing, washing and drying are performed successively. Since a film feeding speed during the photographing operation is generally different from a film feeding speed during the developing operation, various methods have been employed in order to carry out the photographing operation and the developing operation in succession.

According to one of these methods, a buffer chamber is provided between the photographing section and the developing section so that the exposed film is stored in the form of a loop within the chamber, and the difference between the feeding speed in the photographing section and that in the developing section is absorbed or adjusted by the buffer chamber. According to a second method, instead of providing a buffer chamber, a storage chamber is provided to store a certain amount of exposed film. When a predetermined amount of film is exposed and stored in the storage chamber, the film is cut, the photographing operation is stopped, and, subsequently, the stored film is developed.

The former method is advantageous in that the photographing and developing operations can be conducted simultaneously; however, it is disadvantageous in that, when looped, the film overlaps and rubs against adjacent film, thus generating static electricity. Additional disadvantages are that the film may be scratched, and an intricate means is required for adjusting the photographing speed according to the conditions of the loop.

In the second method, as in the first method, the film may rub against adjacent film when stored, thus generating static electricity and possibly scratching the film. As the practical size of the storage chamber is limited, the length of a film which can be stored is limited to several meters. Therefore, the length of a film which can be processed by this method is also limited.

According to a third method, an exposed film is wound on a reel in a storage chamber. It is then cut and fed to a developing unit by turning the reel in the opposite direction, as disclosed in Japanese Patent Application Laid-Open No. 43632/1981. In this method, the exposed film can be stored and developed without encountering the above-described problems. However, this latter method is disadvantageous in that, after the developing operation has begun, the next photographing operation cannot be carried out until all the film which is wound on the reel is fed out.

In a film storage device disclosed by Japanese Patent Application No. 146105/1981, two film winding reels are provided on the same surface of a rotary plate. The rotary plate is turned by a rotary shaft which is perpendicular to the rotary plate so that photographing and developing operations are carried out simultaneously for the two reels. However, this device suffers a drawback in that the film storage section is very bulky.

SUMMARY OF THE INVENTION

In view of the above, an object of the present invention is to provide a film storage device for a camera processor which is capable of storing a large amount of film.

A further object of the present invention is to provide a film storage device which allows photographing and developing operations to be carried out simultaneously.

The above object and other objects of the present invention have been achieved by providing a film storage device which contains a means for exposing a long film, a storage unit for storing an exposed film, a cutter for cutting an exposed film, and means for developing a film which is stored in the storage unit. A photographing track and a developing track are provided separately, and the storage device has two storage tracks which contain a winding reel and a pair of rollers. The storage tracks are supported by a rotatable supporting member, and the winding central axes of the two reels are on the same line, which is perpendicular to the rotary axis of the supporting member. Thus, one of the storage trucks is turned to a position which corresponds to the developing track after the exposed film, which has been wound through the photographing track, has been cut by the cutter, while the other storage track corresponds to the photographing track.

DESCRIPTION OF THE PREFERRED EMBODIMENTS

Figure 1:
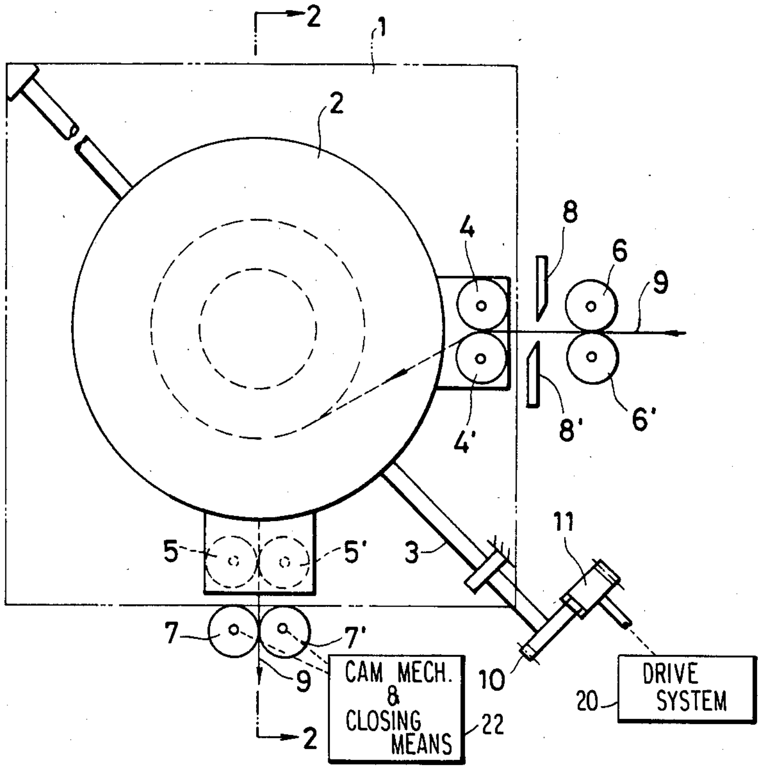
FIG. 1 is a side view showing a first embodiment of a film storage device in a camera processor which is constructed according to the present invention.

FIG. 1 shows a first embodiment of a film storage device in a camera processor according to the present invention.

Figure 2:
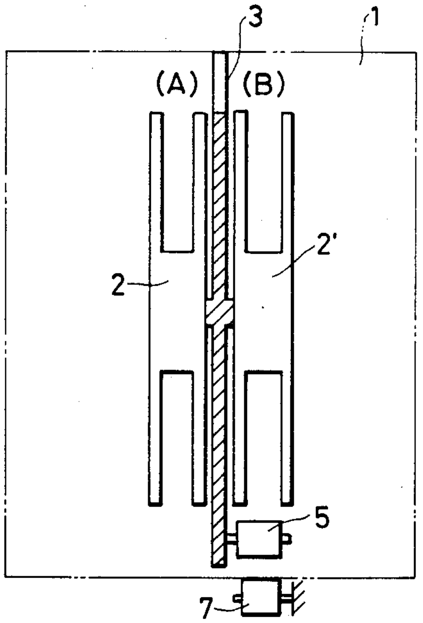
FIG. 2 is a sectional view taken along line 2—2 in FIG. 1.

When a film 9 is exposed to light as many times as desired, a developing starting button is operated so that the exposed film is fed into a film storage section 1 by feed rollers 6 and 6'. The film is then wound on a reel 2 by means of pinch rollers 4 and 4' and a film guide member (not shown). Cutter means 8 and 8' then cut the film 9. In response to an operation completion signal indicating that the cutter means 8 and 8' have been operated, a supporting member 3, which supports two storage tracks, is rotated through 180° by a gear 10 which is coupled to the supporting member 3. A rotating means, such as a gear 11, is connected to a drive system 20, such as an electric motor, and rotates the gear 10. The supporting member 3 may, alternatively, be turned by using a manual lever or the like. As the supporting member 3 is turned 180°, as described above, a storage track A—which comprises the reel 2 and the rollers 4 and 4' on which the exposed film 9 has been wound--takes the place of the storing track B which comprises a reel 2′ and rollers 5 and 5′, as shown in FIG. 2. In addition, the exposed film 9 is moved to a developing section (not shown) while it is held near its cutting edge with rollers 7 and 7′. After the 180° rotation of the supporting member 3, the storage track B is positioned adjacent to the photographing track. Accordingly, the next photographing operation can be initiated immediately. The feed rollers 7 and 7′ may hold the exposed part of the film 9 according to a method in which the supporting member 3 is coupled through a cam mechanism 22 or the like to the feed rollers 7 and 7′ so that at least one of the feed rollers 7 and 7′ is opened when the supporting member 3 is turned. The feed roller thus opened is closed when the cut end portion of the exposed part of the film 9 is positioned between the rollers 7 and 7′. A detector (not shown) for detecting the absence of the exposed film 9 on the storage track which is located on the side of the developing track may be provided at the outlet of the film storage section in order to detect whether or not the next developing operation can be carried out.

Figure 3:
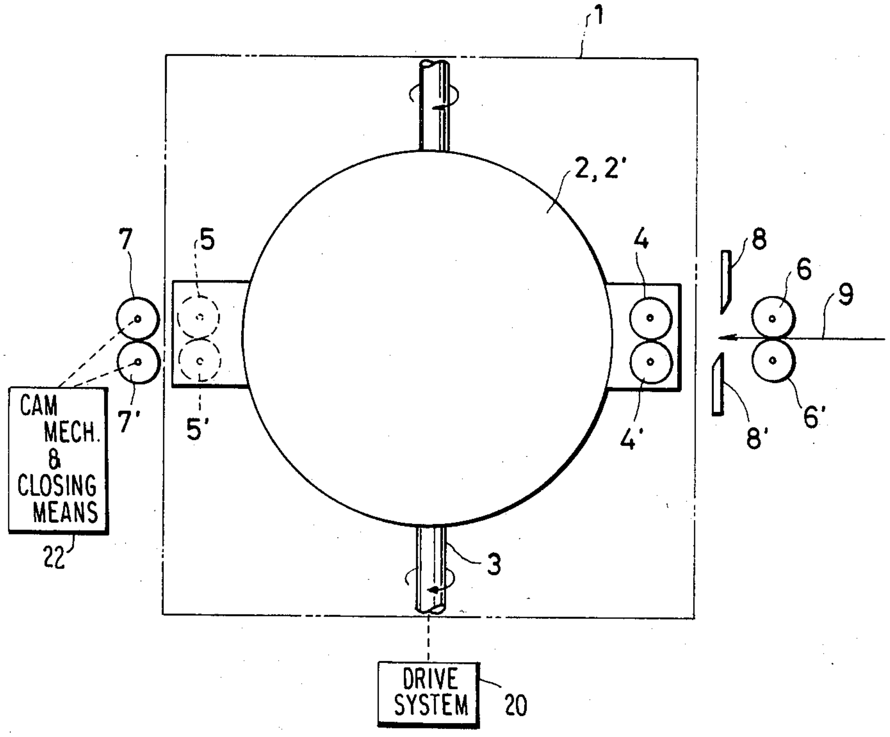
FIG. 3 is a side view showing another embodiment of the film storage device according to the present invention.

In the above-described example of the film storage device, the film inlet is displaced from the film outlet by 90°. However, the degree of displacement may be as large as 180°, as shown in FIG. 3. Also, in the case of FIG. 3, as in the case of FIG. 1, the two film storage tracks are alternately positioned adjacent to the photographing track and the developing track by means of the supporting member 3.

As is apparent from the two, above-described embodiments of the present film storage device, the degree of displacement between the film inlet (through which the film is fed in from the photographing section) of the film storage section and the film outlet (through which the film is fed out to the developing section) can be selected freely by appropriately positioning the supporting member 3.

According to the present invention, the exposed film is stored, in the form of a roll, by using the pairs of reels. Therefore, photographing can be carried out successively by using a long film, and, furthermore, the exposed film is stored by alternately using two storage tracks. Accordingly, while one of the storage tracks is used for developing, the other storage track may be used for photographing, and the device may also be made small in size by arranging the two reels as shown in the figures. Moreover, employment of the device according to the present invention makes it possible to set the degree of displacement freely between the film inlet and the film outlet of the storage device. Thus, the device of the present invention is advantageous in that the arrangement of the photographing section and the developing section is not limited by the positions of the inlet and the outlet, when compared with the conventional device.

We claim:

1. A film storage device for a camera processor for storing an exposed film at a location between a developing track and a photographing track, comprising:

two film storage tracks, each having one reel and a pair of reel rollers;

a rotary shaft interconnecting said reels;

a rotatable supporting member arranged perpendicular to said rotary shaft, said storage tracks being arranged adjacent to each other on both sides of said rotatable supporting member, means for rotating said supporting member sot that said reel rollers of said storage tracks alternately correspond with said photographing track and said developing track;

means for simultaneously feeding film to one of said tracks and removing film from the other of said tracks;

a first pair of feed rollers for feeding said exposed film from said photographing track to one of said pairs of reel rollers; and cutter means for cutting said exposed film; and wherein a film inlet and a film outlet of said film storage device can be positioned so as to be displaced from one another by an angle between 90° and 180°.

2. The storage device as claimed in claim 1 wherein said rotating means comprises a drive system and gear means, said gear means being connected to said drive system and said supporting member.

* * * * *